United States Patent [19]

Gregg

[11] Patent Number: 4,722,516
[45] Date of Patent: Feb. 2, 1988

[54] AIR SPRING WITH FABRIC RESTRAINING CYLINDER

[75] Inventor: Michael J. W. Gregg, Lincoln, Nebr.

[73] Assignee: The Goodyear Tire & Rubber Company, Akron, Ohio

[21] Appl. No.: 910,903

[22] Filed: Sep. 24, 1986

[51] Int. Cl.⁴ ............................................. F16B 9/04
[52] U.S. Cl. ............................ 267/64.27; 188/322.12
[58] Field of Search ............... 188/322.12; 267/64.21, 267/64.24, 64.27

[56] References Cited

U.S. PATENT DOCUMENTS

| | | | |
|---|---|---|---|
| 2,925,265 | 2/1960 | Nassimbene | 267/64.24 |
| 2,939,698 | 6/1960 | Polhemus | 267/64.24 |
| 3,010,715 | 11/1961 | Slemmons et al. | 267/64.24 |
| 3,033,558 | 5/1962 | Slemmons et al. | 267/64.24 |
| 3,043,582 | 7/1962 | Hirtreiter | 267/64.27 X |
| 3,074,709 | 1/1963 | Ballard et al. | 267/64.21 |
| 3,438,309 | 4/1969 | Boileau | 267/64.24 X |
| 3,582,027 | 6/1971 | Hackbarth | 267/124 X |
| 3,897,941 | 8/1975 | Hirtreiter et al. | 267/64.24 |
| 4,332,397 | 6/1982 | Steger | 267/15 A X |
| 4,513,845 | 4/1985 | Stephens et al. | 267/64.24 |

Primary Examiner—Joseph Falk
Attorney, Agent, or Firm—M. R. Dion, Sr.

[57] ABSTRACT

There is disclosed a rolling lobe fluid spring (10) having an upper retainer (12) and a piston (14) with a tubular air impervious flexible membrane (18) sealingly attached thereto to form the airspring. A radially inextensible fabric restraining cylinder (40) is provided circumferentially around the outer periphery of the flexible membrane. The cylinder (40) shrouds the membrane (18) over at least the entire axial working stroke (WA) of the airspring. The cylinder (40) radially supports and protects the flexible membrane (18).

5 Claims, 6 Drawing Figures

AIR SPRING WITH FABRIC RESTRAINING CYLINDER

This invention relates to improved air springs or pneumatic suspension devices for use in automobile and other vehicle suspension systems. In particular the invention relates to air springs of the rolling lobe or sleeve type configuration in which the flexible membrane of the air spring rolls over a contoured piston during the axial stroke of the air spring component. The term air spring is meant to include the device used with any fluid including an incompressible liquid and shall encompass its use as an actuator device.

The flexible membrane of rolling lobe air spring is required to withstand the hoop stresses associated with the internal pressure of the air spring. In general, the greater the internal pressure required of the air spring, the heavier the fabric gauge that is required to withstand the stress. As the thickness of the flexible membrane of the air spring increases the flex fatigue life of that membrane in the area of the rolling lobe meniscus decreases. Most failures in service of a rolling lobe type air spring occur in the area of the flexible member which rolls upward and downward over the formed surface of the piston.

Rigid restraining cylinders surrounding the flexible membrane which are attached to the upper retainer or cap of the air spring configuration are well-known. These rigid retainers are made of metal or plastic and generally serve to absorb the radial hoop stresses exerted on the air spring flexible member by constraining its radial growth during pressurization. These rigid restraining cylinders have several drawbacks. The accommodation of any degree of arcuate action or lateral motion requires complex fastening methods. The rigid retaining cylinders increase the potential of abrasion and wear fatigue of the flexible membrane of the air spring at the contact surface. Further, the rigid metal or plastic restraining cylinders can trap debris between the elastomeric or rubber reinforced flexible member and the inner peripheral surface of the rigid restraining cylinder causing aggravated abrasion and premature failure of the flexible membrane. In addition, stone impingement on the metal restraining cylinder can crack or dent the cylinder which may result in catastrophic damage to the flexible member of the air spring.

An object of this invention is to provide a fabric reinforced elastomeric restraining cylinder which will not sustain the damage associated with rigid restraining cylinders. A further object is to provide an air spring assembly which is resistant to accumulation of debris between the restraining cylinder and the flexible membrane of the air spring. Yet another object is to thermally insulate the flexible membrane of the air spring from heat sources in an automotive application such as exhaust manifolds and general engine heat. An advantage of the invention is that the fabric reinforced elastomeric restraining cylinder works against the elastomeric flexible membrane of the air spring to break loose and dislodge any debris which may become entrapped between the restraining cylinder and the flexible membrane during service. The axial travel of the air spring during full jounce and rebound will expel any such debris during normal service and operation of the air spring. A further advantage of the elastomeric restraining cylinder is the accurate or lateral motion of the air spring travel is accommodated. This is of particular advantage in an automotive strut or suspension member application. The restraining cylinder allows limited contact with the A-arm of the suspension without damage to the integrity of the air spring.

Other objects and advantages will become apparent from the following description of the invention.

BRIEF DESCRIPTION OF THE INVENTION

An embodiment of the invention is a rolling lobe air spring having an axis and an axial stroke, said air spring comprising a rigid end cap; a piston axially spaced apart from said rigid end cap having an outside peripheral surface; a flexible membrane, said membrane being sealingly attached around the circumference of said rigid end cap on one end and around said rigid piston on said other end to form a working cavity therebetween, said flexible membrane forming a meniscus as the piston moves axially relative to said rigid end cap over the axial stroke of the air spring, said flexible membrane forming an inflated diameter when said working cavity is pressurized with fluid; and a fabric restraining cylinder attached at one end to said rigid end cap at a first end and extending coaxially with said flexible member from said end cap over the axial stroke of said airspring, having a diameter less than said inflated diameter of said flexible membrane, and formed of circumferentially extending primary reinforcement cords which are substantially inextensible in the radial direction thereby restraining the radial extension of said flexible membrane when said working cavity is pressurized.

DETAILED DESCRIPTION OF THE INVENTION

Figure 1:
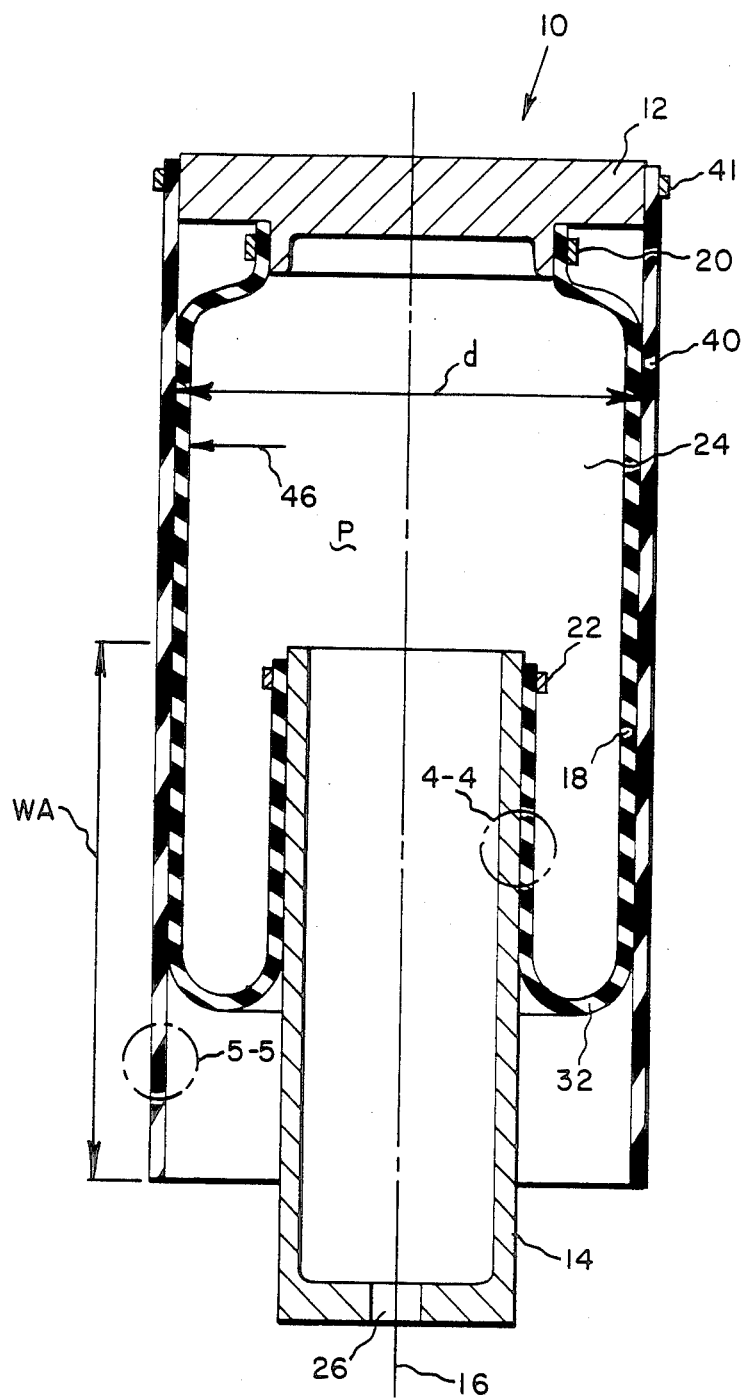
FIG. 1 is a view of an air spring of the invention mostly in cross section with a partial cutaway of the fabric restraining cylinder.
Figure 4:
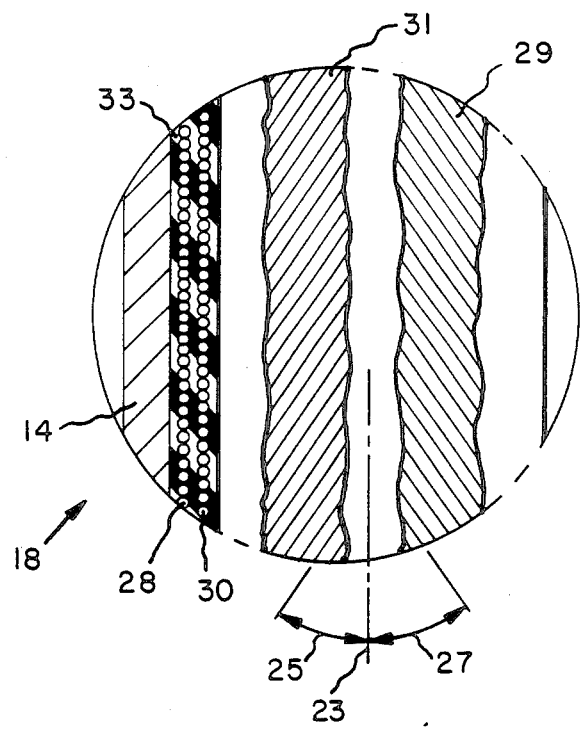
FIG. 4 is an enlarged portion of FIG. 1 taken at 4—4 showing the inner construction of the flexible membrane.

FIG. 1 illustrates a simple form of the invention in which an air spring 10 is composed of a cap 12, a piston 14, which are spaced apart axially along the axis of movement 16 of the air spring 10. Sealingly attached between the piston 14 and the cap 12 is a conventional flexible membrane 18 which is air tightly attached to the cap 12 and the piston 14 by any conventional means such as clamp rings 20 and 22 to form a working cavity 24 therebetween. All of the elements of the air spring described to this point are well-known in the art and a detailed description of the manner in which such rolling lobe or sleeve-type air springs can be made and used is contained in U.S. Pat. No. 3,043,582 to Hirtreiter and U.S. Pat. No. 3,897,941 to Hirtreiter and Kluss, both of which are herein incorporated by reference. It is apparent that when the conventional air spring as described to this point is pressurized to its intended working pressure by introducing pressurized air through channel 26 that the flexible member 18 must absorb all radial hoop stresses and axial stresses associated with the level of internal pressure P in working cavity 24. Any suitable valve means may be fitted in channel 26 to control air intake and exhaust. The flexible membrane 18 achieves an equilibrium diameter d through the pantographing of the bias-laid fabric reinforcements 28 and 30 shown in FIG. 4. The fabric is preferably of cord-type fabric in which the primary strength cords 29, 31 are embedded in a matrix 33 of rubber or elastomer. The cords are laid at a bias angle 25,27 to the axis 16 of the airspring, generally at opposite angles 25,27 for each successive fabric layer. FIG. 4 illustrates angles 25,27 as measured relative to an imaginary line 23 which is parallel to axis 16 and lying on the surface of the fabric layer. The necessity of designing the flexible membrane 18 to be capable of withstanding the hoop stresses from the internal working pressure of the working cavity 24 requires an appropriate selection of heavyweight fabrics and rubber elastomer for coating the fabrics in order to withstand the internal pressures. The heavy fabrics and relatively stiff rubber compounds tend to be counterproductive to minimization of heat buildup or hysteresis of the working area of the flexible member which rolls up and down the outer periphery of the piston 14 to form the meniscus 32. The meniscus 32 is the characteristic shape of a rolling lobe or sleeve-type air spring when in its inflated and working condition. The flex life of the fabric in this critical working area WA of the flexible membrane 18 is generally compromised by the need to have heavy fabrics and relatively stiff rubber compounds to withstand the hoop stresses. The axial range of the working area WA is also called the axial stroke of the air spring. The fabric restraining cylinder must extend downward from the cap 12 over the entire axial stroke to effectively restrain the flexible membrane 18.

Figure 5:
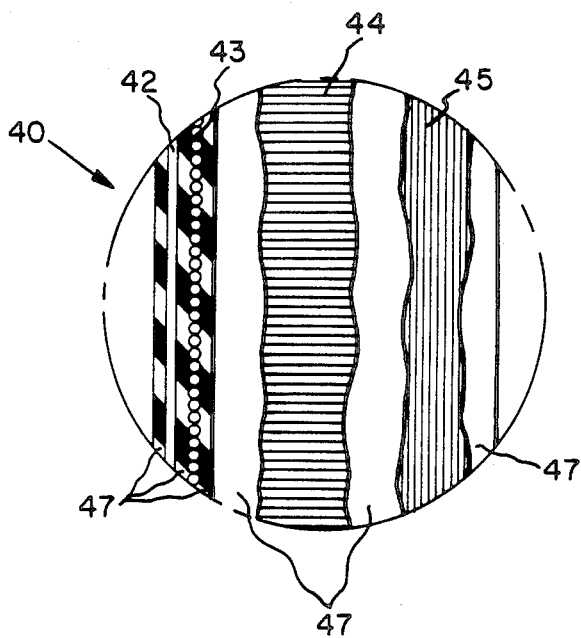
FIG. 5 is an enlarged portion of FIG. 1 taken at 5—5 showing the inner construction of the fabric restraining cylinder.

The air spring of this invention adds a critical additional element to the conventional air spring rolling lobe construction by inclusion of a full length fabric restraining cylinder 40. FIG. 5 shows its constructional detail. It is attached to the cap 12 by a clamp ring 41. The fabric restraining cylinder is composed of at least one layer 42 of fabric in which the high strength cords 44 run circumferentially around the diameter of the fabric restraining cylinder. This circumferential cord configuration assures that the fabric restraining cylinder is substantially radially inextensible within the operating pressure range of the air spring 10. This fabric restraining cylinder 40 through its high strength circumferentially laid cord pattern absorbs the radially directed hoop stresses 46 which originate from the internal pressurization of the air spring 10 in service. The type of fabric can be any of the cord type fabrics commonly used in tire construction, preferably, other high strength circumferentially oriented textile or wire fabrics can also be used.

The fabric restraining cylinder 40 is composed of primary strength cords 44 embedded in a rubber or elastomeric matrix 47. It is understood that this matrix may be any of the families of elastomers, including natural and synthetic rubbers, thermoplastic rubbers and elastomers, urethanes, polyvinylchloride. More preferred for the matrix are the polymers which are weather, oil and ozone resistant such as polychloroprene or NBR/PVC blends. Weather and ozone resistant polymers such as EPDM or EPR rubbers may also be advantageously utilized in these exposed membranes.

By the inclusion in the air spring structure of the fabric restraining cylinder 40, the flexible membrane 18 of the air spring is effectively relieved of the functional requirement that it resist the radial hoop stresses 46 of the internal working pressure P. A most preferred orientation of the major cords 44 and minor cords 45 are 90 and 0 degrees respectively from the axis of movement 16 of the air spring. These minor cords 45 are used for processing purposes only and may be eliminated using alternative fabric preparation and building processes known in the art. It is understood that the high strength, low extensibility circumferential cords 44 are at the 90 degree orientation. This simply states that they are in a circumferentially arranged orientation around the fabric restraining cylinder 40. A variation of approximately ten degrees from zero and 90 degrees for 44 and 45 respectively is well within the scope of this invention insofar as a substantial radially inextensible fabric restraining cylinder 40 results within the working conditions of pressure P and axial load under which the air spring operates. A simple cord fabric has high strength cord members 44 only in one direction and may have very weak pick yarns perpendicular to the cords to position the cords parallel in a plane. If such a cord fabric is used, then two adjacent layers 42, 43 of calendered cord fabric may be utilized with the cord members oriented at 0° and 90° relative to the axis. Only the 90° cords are functioning to absorb hoop stresses while the 0° layer serves to hold the cords of the 90° layer in exact orientation by the interaction of the rubber matrix 47 which united the two layers. It also provides integrity of the cylinder 40 in the axial direction parallel to axis 16. Similar integrity can be provided by the matrix material 47 or other conventional fabric reinforcement. The rubber is calendered onto the fabric prior to laying up of the fabric layers on a mandrel to form the cylinder 40 or 52.

Figure 2:
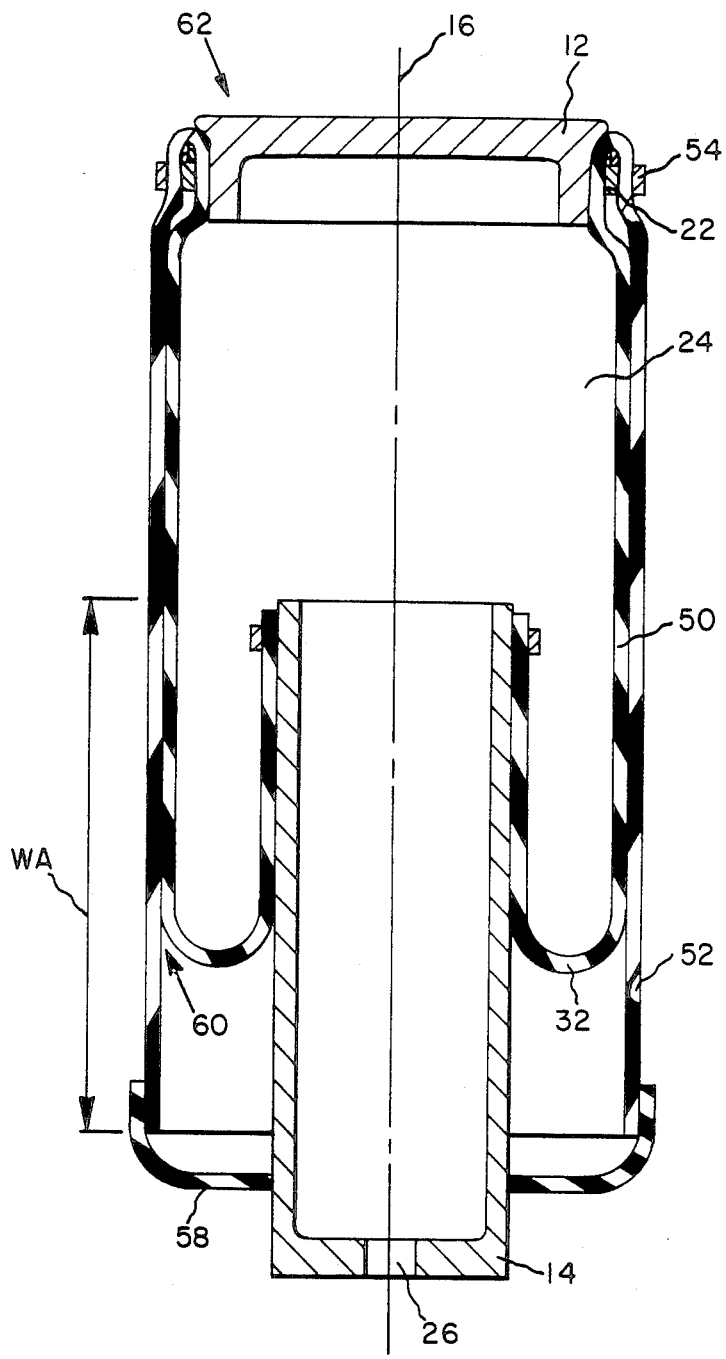
FIG. 2 is a cross section view of another embodiment having a dirt shield and a coextensive sleeve of the flexible membrane and the fabric restraining cylinder.

A more preferred form of the invention is shown in FIG. 2 in which the conventional components of the air spring 62 are identical to FIG. 1. However, the flexible membrane 50 and the fabric restraining cylinder 52 are coextensive with each other through the area of the cap 12 where the clamp ring 22 attaches the flexible membrane 50 air tightly to the cap 12. This is a unique configuration. The fabric restraining cylinder 52 is affixed to the cap 12 by a clamp ring 54. It is understood that the clamping mechanism being utilized for the fabric restraining cylinder does not require that the junction be airtight and pressure resistant. This is, of course, due to the fact that the fabric restraining cylinder 52 does not directly come into contact with the pressurized fluid inside of the working cavity 24 of the air spring 62. The constructional details of cylinders 52 are identical to cylinder 40 of FIG. 5.

An optional feature of the invention shown in FIG. 2 is a flexible dirt shield 58 which is coextensively molded or attached to the fabric restraining cylinder 52 and contiguous with the piston 14. It affords protection from dirt, debris and ice which may accumulate on the piston to meniscus interface 60 and adversely affect the service life of the air spring 62 of FIG. 2. The dirt shield 58 is especially useful when the air spring 62 is used in conjunction with other hydraulic damping means in a strut or major suspension member of a vehicle suspension. In these applications, the piston 14 may actually be the exterior shell of the hydraulic shock absorber in an air strut or suspension member.

Figure 3:
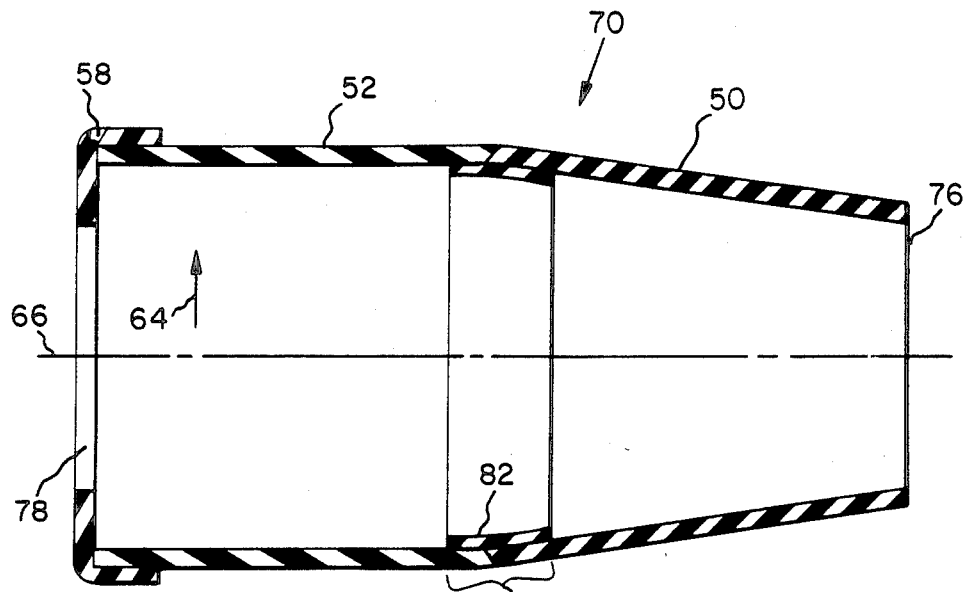
FIG. 3 is a cutaway view of the coextensive sleeve of FIG. 2 showing the orientation of the various reinforcing fabrics in the sleeve.

FIG. 3 shows a partial cutaway, partial cross sectional view of the combined or coextensive fabric restraining cylinder 52 and flexible membrane 50 shown in FIG. 2. The fabric restraining cylinder portion of 52 has a primary strength cord direction 64 which is circumferentially arranged relative to the axis 66. A second support fabric may be positioned such that the primary cords run parallel to the axis 66. These simply maintain the circumferential cords in the proper orientation during manufacturing and service. This structure before it is cured is called the preformed sleeve 70. The construction details of the fabric restraining cylinder portion 52 and the flexible membrane portion 50 are identical to FIGS. 4 and 5 with regard to the fabric orientations, and rubber encapsulation. U.S. Pat. No. 3,043,582 provides further detail on the flexible membrane 50 construction. However, the tapered profile of the membrane 50 can be accomplished by the unique steps of building up alternate layers of rubber covered, calendared bias-laid fabric onto a cylindrical mandrel having a diameter equal to the smaller diameter end 76. This preform is then forced onto a tapered mandrel with large and small diameter ends substantially equal to ends 78 and 76 respectively. The bias fabrics pantograph to accommodate the larger diameter end. This expanded preform can then be cured using conventional methods. Alternately, the fabric restraining cylinder portion 52 of preform 70 can be then laid up on cylindrical extension of the tapered mandrel and subsequently cured to form the preform 70 as shown in FIG. 3. The lesser diameter end 76 of the sleeve 70 is attached during the assembly of the air spring to the piston by clamp ring 20. The greater diameter end 78 includes the radially extending dirt shield 58 which grazingly contacts the piston 14 during the stroke of the air spring. The transition zone 80 between the fabric restraining portion 52 and the flexible membrane 50 is the area that is fixed to the cap 12 by clamp rings 22 and 54 respectively. It also is where the two dissimilar fabrics are joined by a splice 82 or integrally cured together. While FIG. 3 illustrates an efficient method of manufacturing it is understood that the flexible membrane and the fabric restraining cylinder 52 can advantageously be made in separate building and curing steps and the embodiment set forth in FIG. 2 can be modified to the extent that the elements 52 and 50 would not be coextensive but would rather be detached from each other and would be affixed by suitable clamping means to the cap 12 or an extension thereof as shown in FIG. 1.

The air spring 10 of FIG. 1 can be utilized as a hydraulic apparatus for handling very high pressures P by utilizing very strong, inextensible circumferential cords such as aromatic polyamides or Kevlar ™ in cylinder 40 and filling the working cavity 24 with an incompressible liquid or fluid. The channel 26 would be connected to a suitable means for storing fluid energy such as a conventional accumulator, pressurized hydraulic reservoir or similar devices. This use of the structure would replace conventional hydraulic cylinders with reliable, friction free devices for use in actively controlled automotive suspensions which can react instantaneously to conditions through hydraulic pressure variations.

Figure 6:
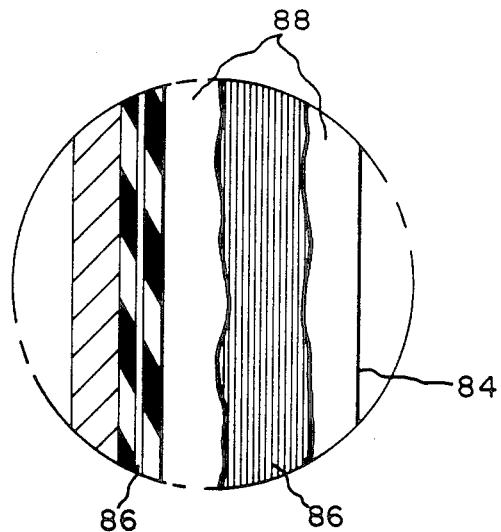
FIG. 6 is an enlarged portion of the flexible membrane of an alternative embodiment in which only axially oriented reinforcement cords are used.

The ability of the cylinder 40 to withstand substantially all radial or hoop stresses of the air spring would allow the flexible membrane 18 to be made using only cords which run substantially parallel to axis 16 since only axially directed stresses need to be absorbed by membrane 18. Thus, membrane 18 need not be built with bias-laid fabrics like those of layers 28,30 of FIG. 4. This single directional cord fabric approach shown in FIG. 6 would give membrane 84 great flexibility and very long flex life relative to the membrane 18 of FIG. 4. FIG. 6 illustrates this embodiment showing a flexible membrane 84 in cutaway sections having only axially directed reinforcement cords 86 which are generally parallel to axis 16 of FIG. 1. The cords 86 are embedded in a rubber matrix 88 in conventional manner.

Preferred embodiments of the invention have been shown and described for illustrative purposes. It will now become apparent to those skilled in the art that various changes to the form and detail may be made without departing from the scope of the invention. Accordingly, the scope of the invention is set forth in the following claims.

What is claimed is:

1. A rolling lobe air spring having an axis and an axial stroke, said air spring comprising:
   (a) a rigid end cap:
   (b) a piston axially spaced apart from said rigid end cap having an outside peripheral surface:
   (c) a flexible membrane, said membrane being sealingly attached around the circumference of said rigid end cap on one end and around said rigid piston on said other end to form a working cavity therebetween, said flexible membrane forming a meniscus as the piston moves axially relative to said rigid end cap over the axial stroke of the air spring, said flexible membrane forming an inflated diameter when said working cavity is pressurized with fluid; and
   (d) a fabric restraining cylinder attached at one end to said rigid end cap at a first end and extending coaxially with said flexible member from said end cap over the axial stroke of said airspring, having a diameter less than said inflated diameter of said flexible membrane, and formed of circumferentially extending primary reinforcement cords which are substantially inextensible in the radial direction thereby restraining the radial extension of said flexible membrane when said working cavity is pressurized.

2. An air spring according to claim 1 further comprising a flexible dirt shield attached to said fabric restraining cylinder at an end of the cylinder distal said first end and extending radially inward to contact said outside peripheral surface of said piston.

3. An air spring according to claim 2 wherein said fabric restraining cylinder and said flexible membrane are coextensive and integrally formed as a single sleeve such that said first end of said fabric restraining cylinder is integrally joined at a junction with said one end of said flexible membrane, said junction being sealably attached to said rigid end cap.

4. An air spring according to claim 1 wherein said flexible membrane consists essentially of: reinforcement cords oriented parallel to said axis, embedded in a rubber matrix.

5. A fluid actuation device having an axis and an axial stroke, said device comprising:
   (a) a rigid end cap:
   (b) a piston axially spaced apart from said rigid end cap having an outside peripheral surface:
   (c) a flexible membrane, said membrane being sealingly attached around the circumference of said rigid end cap on one end and around said rigid piston on said other end to form a working cavity therebetween, said flexible membrane forming a meniscus as the piston moves axially relative to said rigid end cap over the axial stroke, said working cavity being filled with an incompressible fluid under pressure, forming an inflated diameter of said flexible membrane:

(d) a fabric restraining cylinder attached to said rigid end cap at a first end coaxially surrounding said flexible member from said end cap and extending over the axial stroke of said device, and having a diameter less than said inflated diameter of said flexible membrane, and formed of circumferentially extending primary reinforcement cords which are substantially inextensible in the radial direction thereby restraining the radial extension of said flexible membrane when said working cavity is pressurized;

(e) an external means for storing fluid energy; and (f) a channel connecting said working cavity with said means for storing fluid energy to allow the passage of said incompressible fluid.

* * * * *